US005980262A

United States Patent [19]
Tseng et al.

[11] Patent Number: 5,980,262

[45] Date of Patent: Nov. 9, 1999

[54] METHOD AND APPARATUS FOR GENERATING MUSICAL ACCOMPANIMENT SIGNALS AT A LOWER STORAGE SPACE REQUIREMENT

[75] Inventors: Kevin Tseng; Kuang-Hsun Hsieh; William Wang, all of Taipei, Taiwan

[73] Assignee: Mitac, Inc., Taipei, Taiwan

[21] Appl. No.: 08/867,435

[22] Filed: Jun. 2, 1997

[51] Int. Cl.[6] ................................ G09B 5/00; G10H 1/36

[52] U.S. Cl. ........................ 434/307 A; 434/318; 84/610; 386/105; 369/32

[58] Field of Search ................................ 434/307 R–309, 434/318, 365; 84/477 R, 601–610, 625, 630, 631, 634, 645, 650; 369/2, 47, 48, 32, 58, 34; 386/55, 97, 105, 102; 360/72.2, 33.01, 77.01; 348/7, 9, 12, 478, 571, 589, 688; 381/81

[56] References Cited

U.S. PATENT DOCUMENTS

| | | | |
|---|---|---|---|
| 5,453,570 | 9/1995 | Umeda et al. | 84/477 R X |
| 5,495,443 | 2/1996 | Nakai et al. | 434/307 A |
| 5,561,649 | 10/1996 | Lee et al. | 369/47 |
| 5,574,243 | 11/1996 | Nakai et al. | 386/97 X |
| 5,609,486 | 3/1997 | Miyashita et al. | 434/307 A |
| 5,611,693 | 3/1997 | Chaya et al. | 348/571 X |
| 5,616,876 | 4/1997 | Cluts | 84/609 |
| 5,683,253 | 11/1997 | Park et al. | 434/307 A |
| 5,770,811 | 6/1998 | Haino | 84/477 R X |
| 5,803,747 | 9/1998 | Sone et al. | 360/72.2 X |
| 5,808,223 | 9/1998 | Kurakake et al. | 84/609 |
| 5,863,206 | 1/1999 | Narusawa et al. | 434/307 A |
| 5,880,388 | 3/1999 | Kajiyama et al. | 84/610 X |
| 5,898,119 | 4/1999 | Tseng et al. | 84/610 |

*Primary Examiner*—Joe H. Cheng
*Attorney, Agent, or Firm*—Alston & Bird LLP

[57] ABSTRACT

In a method and apparatus for generating musical accompaniment signals corresponding to a musical program, there is provided a recording medium which has an audio storage unit and a lyric storage unit separate from the audio storage unit. The audio storage unit and the lyric storage unit respectively have a plurality of audio music data and a plurality of lyric data corresponding to a plurality of the musical programs stored therein. The lyric data include encoded text data and timing information. In operation, the audio music data and the lyric data corresponding to a selected one of the musical programs are retrieved from the recording medium. The encoded text data and timing information retrieved from the recording medium are decoded to obtain decoded data, and bitmap data are then generated from the decoded data. The bitmap data are synchronized with the audio music data retrieved from the recording medium in accordance with the timing information. The audio music data retrieved from the recording medium are provided to a sound card to obtain an audio output. The bitmap data are provided to a VGA card to obtain a video signal.

22 Claims, 3 Drawing Sheets

METHOD AND APPARATUS FOR GENERATING MUSICAL ACCOMPANIMENT SIGNALS AT A LOWER STORAGE SPACE REQUIREMENT

BACKGROUND OF THE INVENTION

1. Field of the Invention

The invention relates to a method and apparatus for generating musical accompaniment signals corresponding to a musical program, more particularly to a method and apparatus which generates musical accompaniment signals at a lower storage space requirement.

2. Description of the Related Art

An apparatus capable of reproducing audio-visual signals which were recorded on a recording medium is known in the art. One example of such an apparatus is a karaoke reproducing apparatus which reproduces audio-visual musical accompaniment signals that were especially prepared for people to sing along with.

In the conventional karaoke reproducing apparatus, the musical accompaniment signals of a musical program include audio music data, video data and lyric data overlaid onto the video data. Currently, the musical accompaniment signals corresponding to one musical program are stored in a single file encoded in the Moving Picture Expert Group (MPEG) standard format. Thus, each musical program takes up a relatively large amount of storage space, thereby resulting in a relatively small number of musical programs that can be recorded on a single recording medium.

While different compression techniques, such as the MPEG Layer 3 standard compression format, are available to reduce the storage space requirement of audio music data, such compression techniques cannot be employed in the conventional karaoke reproducing apparatus in view of the fact that the musical accompaniment signals corresponding to one musical program are stored in a single file. Moreover, synchronization of the lyric data with the audio music data is not possible in the prior art if the audio music data is compressed.

SUMMARY OF THE INVENTION

The object of the present invention is to provide a method and apparatus for generating musical accompaniment signals which permit a musical program to take up a smaller amount of storage space to result in a larger number of musical programs that can be recorded on a single recording medium as compared to the prior art.

Specifically, the main object of the present invention is to provide a method and apparatus for generating musical accompaniment signals in which the audio music data are stored separate from the lyric data, which include encoded text data and timing information, such that compression of the audio music data is possible to result in a larger number of the musical programs that can be recorded on a single recording medium as compared to the prior art, while still permitting synchronization of the audio music data with the lyric data.

Another object of the present invention is to provide a method and apparatus for generating audio-visual musical accompaniment signals in which the video data are stored separate from the audio music data and the lyric data and are to be commonly shared by a plurality of musical programs so as to further increase the number of the musical programs that can be recorded on a single recording medium as compared to the prior art.

According to one aspect of the invention, a method for generating musical accompaniment signals corresponding to a musical program comprises the steps of:

(a) providing a recording medium which has an audio storage unit and a lyric storage unit separate from the audio storage unit, the audio storage unit and the lyric storage unit respectively having a plurality of audio music data and a plurality of lyric data corresponding to a plurality of the musical programs stored therein, the lyric data including encoded text data and timing information;

(b) retrieving the audio music data and the lyric data corresponding to a selected one of the musical programs from the recording medium;

(c) decoding the encoded text data and timing information retrieved from the recording medium to obtain decoded data;

(d) generating bitmap data from the decoded data;

(e) synchronizing the bitmap data with the audio music data retrieved from the recording medium in accordance with the timing information;

(f) providing the audio music data retrieved from the recording medium to an audio converter means to obtain an audio output; and (g) providing the bitmap data to a bitmap converting means to obtain a video signal.

According to another aspect of the present invention, an apparatus for generating musical accompaniment signals corresponding to a musical program comprises:

a recording medium which has an audio storage unit and a lyric storage unit separate from the audio storage unit, the audio storage unit and the lyric storage unit respectively having a plurality of audio music data and a plurality of lyric data corresponding to a plurality of the musical programs stored therein, the lyric data including encoded text data and timing information;

processor means connected the recording medium and operable so as to retrieve the audio music data and the lyric data corresponding to a selected one of the musical programs from the recording medium, the processor means decoding the encoded text data and timing information retrieved from the recording medium to obtain decoded data, and generating bitmap data from the decoded data, the processor means further synchronizing the bitmap data with the audio music data retrieved from the recording medium in accordance with the timing information;

audio converter means connected to the processor means, the processor means providing the audio music data retrieved from the recording medium to the audio converter means so as to obtain an audio output; and bitmap converting means connected to the processor means, the processor means providing the bitmap data to the bitmap converting means so as to obtain a video signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
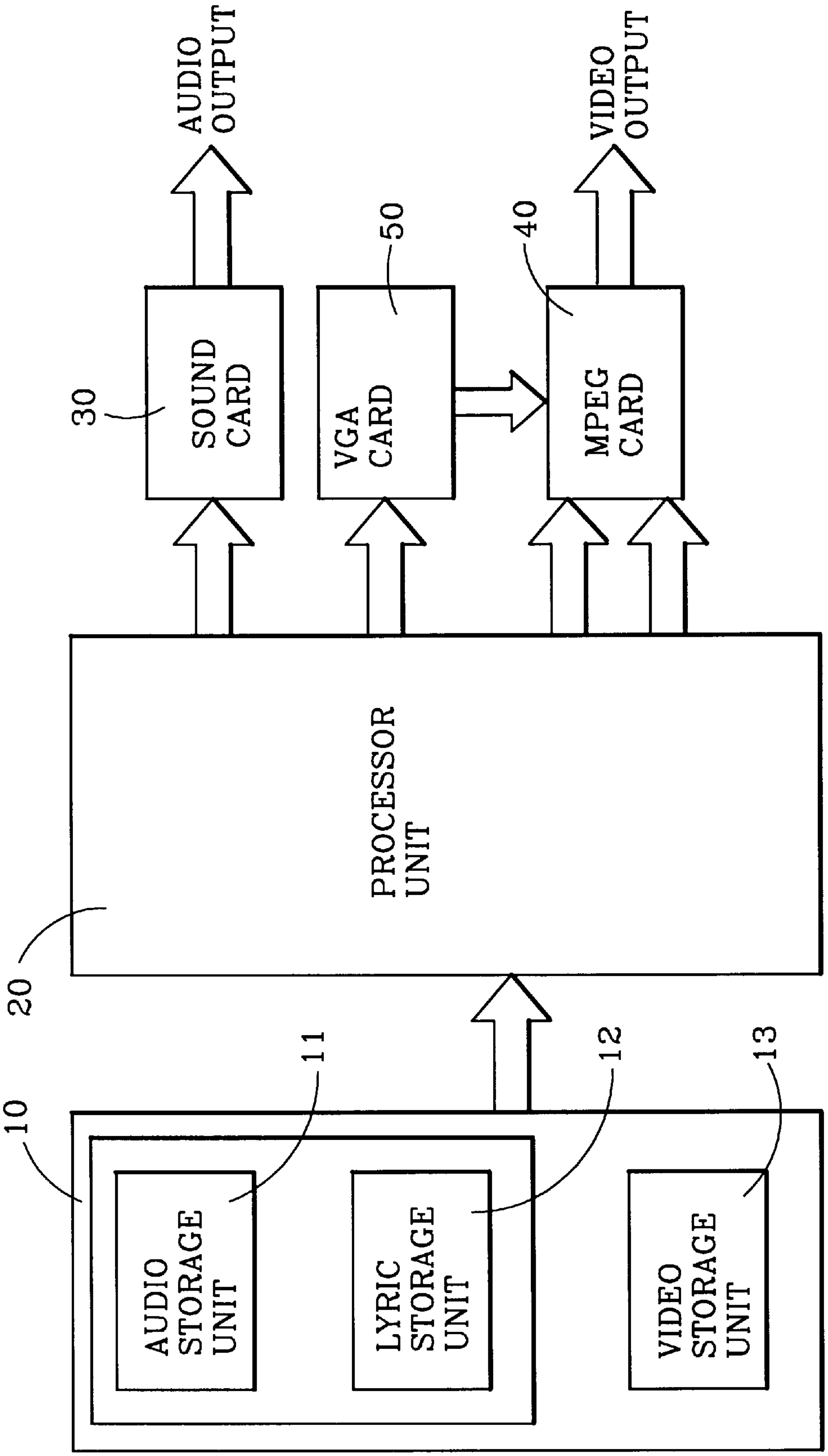
FIG. 1 is a schematic circuit block diagram of the preferred embodiment of a musical accompaniment apparatus according to the present invention.

Referring to FIG. 1, the preferred embodiment of a musical accompaniment apparatus according to the present invention is shown to comprise a recording medium 10, a processor unit 20, a sound card 30, an MPEG card 40 and a Video Graphics Adapter (VGA) card 50.

The recording medium 10, which may be in the form of a hard disk or a CD-ROM, includes an audio storage unit 11, a lyric storage unit 12 and a video storage unit 13. The audio storage unit 11 and the video storage unit 12 respectively have a plurality of audio music data and a plurality of lyric data, which correspond to a plurality of musical programs, stored therein. Unlike the prior art, the audio storage unit 11, the video storage unit 12 and the video storage unit 13 are separate from each other. The video storage unit 13 has a plurality of video segments, which are to be commonly shared by all of the musical programs, stored therein.

Figure 2:
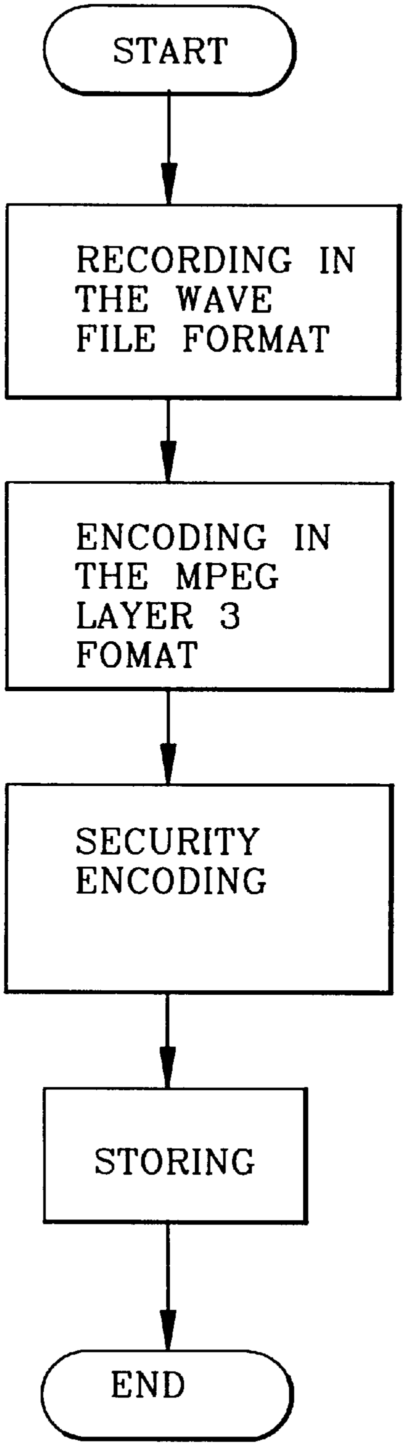
FIG. 2 is a flowchart illustrating how audio music data is prepared in the preferred embodiment.

Referring to FIG. 2, the audio music data stored in the audio storage unit 11 is prepared in the following manner: Initially, the audio music data for a musical program is recorded in a WAVE file format. Thereafter, the WAVE file is encoded in the MPEG Layer 3 standard compression format, and the MPEG Layer 3 file is further encoded to guard against unauthorized duplication prior to storage in the audio storage unit 11. As such, with the audio music data stored in the MPEG Layer 3 standard compression format, an audio output of higher quality can be obtained at a lower storage space requirement as compared with the prior art which uses the audio music data encoded in the MIDI format.

Figure 3:
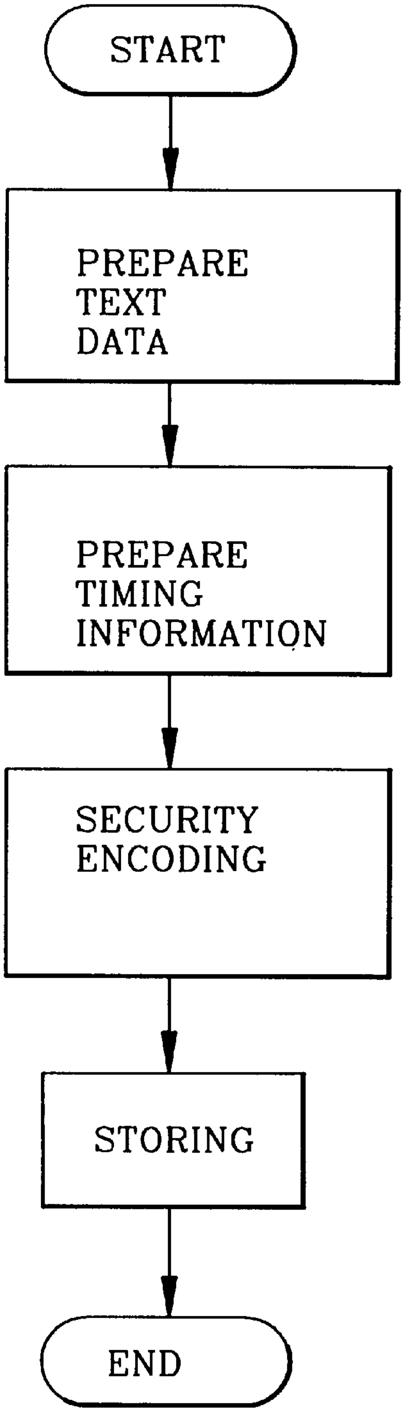
FIG. 3 is a flowchart illustrating how lyric data is prepared in the preferred embodiment.

The lyric data stored in the lyric storage unit 12 includes encoded text data and timing information for synchronizing the text data with the audio music data as they are retrieved from the recording medium 10 when outputting a selected musical program. Referring to FIG. 3, the lyric data stored in the lyric storage unit 12 is prepared in the following manner: Initially, the text data, which includes program description information and verses of the corresponding musical program, is obtained in a conventional manner with the use of a character input device (not shown) and is stored as a script file. The timing information is then obtained with the aid of a computer (not shown) using the corresponding audio music data in the WAVE file format as reference. The text data and the timing information are then encoded to guard against unauthorized duplication prior to storage in the lyric storage unit 12. The timing information will be described in greater detail in the succeeding paragraphs.

The video segments are prepared with the use of an image capturing device, such as a camera, and may pertain to people, animals, plants or scenic spots. The video segments are stored in the video storage unit 13 in the MPEG standard coding format. Preferably, the video segments are classified into different categories according to the mood which they convey to the viewer, e.g. happy, sad, romantic, etc., in order to match the mood of the selected musical program.

The processor unit 20 is connected to the recording medium 10, the sound card 30, the MPEG card 40 and the VGA card 50, and is operable so as to output a selected one of the musical programs. Selection of a musical program is done in a known manner, such as with the use of a remote control device (not shown).

Figure 4:
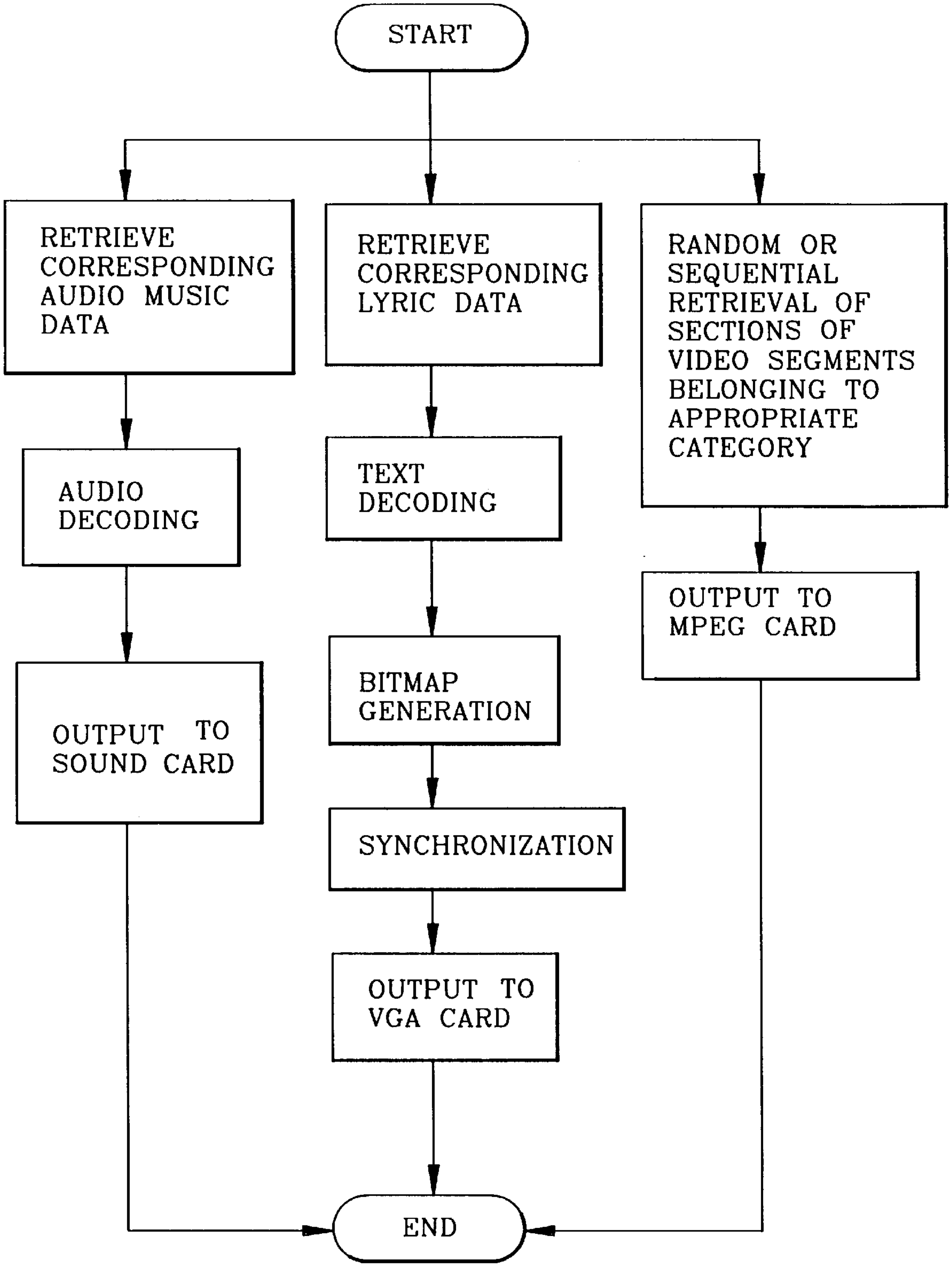
FIG. 4 is a flowchart illustrating the operation of a processor unit of the preferred embodiment.

FIG. 4 is a flowchart illustrating the operation of the processor unit 20. As illustrated, upon actuation of the control device so as to select a musical program, the processor unit 20 retrieves the audio music data and the lyric data corresponding to the selected musical program from the recording medium 10. The processor unit 20 decodes the audio music data before providing the same to the sound card 30, which in turn is connected to an audio output device (not shown), such as a loudspeaker, and which generates an analog audio output that is provided to the audio output device for audio reproduction purposes, as shown in FIG. 1. The processor unit 20 decodes the lyric data to recover the text data and the timing information. The processor unit 20 then generates bitmap data corresponding to the text data, and synchronizes the supply of the bitmap data to the VGA card 50 with the supply of the audio music data to the sound card 30 in accordance with the timing information. The VGA card 50 serves to convert the bitmap data received thereby into a VGA signal that is supplied to the MPEG card 40, as shown in FIG. 1.

Simultaneous with the retrieval of the audio music data and the lyric data from the recording medium 10, the processor unit 20 retrieves at least a section of a video segment belonging to the appropriate category that matches the mood of the selected musical program from the recording medium 10 in a random or sequential manner. Since the retrieved sections of the video segments are shorter than those of the audio music data, a number of sections of the video segments are required for each musical program. To avoid sharp transitions between successive video segments, the processing unit 20 can be programmed to process the section of a preceding one of the video segments retrieved from the recording medium 10 to generate a fade-out effect at the end of the section of the preceding one of the video segments, and further process the section of a succeeding one of the video segments retrieved from the recording medium 10 to generate a fade-in effect at the start of the section of the succeeding one of the video segments. Of course, if the video segments are retrieved from the recording medium 10 in their entirety, the video segments can be processed instead prior to storage in the recording medium 10 so as to generate a fade-in effect at the start of the video segment and a fade-out effect at the end of the video segment. The processor unit 20 provides the video segments retrieved thereby to the MPEG card 40.

Referring again to FIG. 1, the MPEG card 40 combines the VGA signal from the VGA card 50 with the video segments from the processor unit 20 by overlaying the VGA signal onto the video segments. The MPEG card 40 supplies an NTSC television video output signal to a video output device (not shown), such as a monitor.

In the present invention, the processor unit 20 generates a highlighting command signal in accordance with the timing information, and provides the highlighting command signal to the VGA card 50 simultaneous with the bitmap data. The highlighting command signal is used for highlighting of words of the verses of the corresponding musical program as they are shown on the video output device. Highlighting is then achieved using known methods, including underlining, displaying in bold, color inversion or a bouncing ball indication.

As mentioned hereinbefore, the text data include program description information and verses of the corresponding musical program. Preferably, the verses of each musical program are grouped into sections, such as the different vocal parts in a duet or the different verses present in a bilingual language format. The timing information includes show time, start time and ticks information for the verses of the different sections of the corresponding musical program. The show time information is used to control the processor unit 20 as to when the bitmap data for the verses of the different sections of the musical program are to be provided to the VGA card 50 in relation to the supply of the audio music data corresponding to the musical program to the sound card 30. The start time information is used to control the processor unit 20 to start the generation of the highlighting command signal for the verses of the different sections of the musical program after the bitmap data for the verses have been provided to the VGA card 50. The ticks information is used to control the frequency of generation of the highlighting command signal for the words in the verses of the musical program after the bitmap data for the verses have been provided by the processor unit 20 to the VGA card 50.

It has been described beforehand that the timing information is obtained with the aid of a computer (not shown) using the corresponding audio music data in the WAVE file format as reference. In the preferred embodiment, the verses of each section of the musical program are successively displayed on a computer monitor while the corresponding audio music data is being reproduced. Thereafter, with the use of an input device, such as a keyboard, the operator of the computer controls when the verses are to be shown, when highlighting of each verse starts, and the frequency of highlighting for the words in each verse. The computer then derives the required timing information based on the operation of the input device by the operator.

It should be noted that, when the video segments are retrieved from the recording medium 10 in a random manner, the video segments which are retrieved when a musical program is selected for the second time may differ from those retrieved when the same musical program is selected for the first time, thereby creating a livelier environment as compared to the prior art which relies on a fixed set of images for a particular musical program.

The musical accompaniment apparatus of this invention further allows for skipping from a current video segment being retrieved by the processor unit 20 to another video segment as desired by the user. Control of the processor unit 20 to achieve this function can be done with the use of the remote control device (not shown).

Therefore, in the apparatus of this invention, the total number of video segments stored in the recording medium 10 may be fewer than the total number of musical programs, and the audio music data can be compressed to further reduce the storage space requirement, thereby resulting in up to 10% reduction in the cost per musical program, and in a corresponding increase in the number of the musical programs that can be recorded on a single recording medium as compared to the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for generating musical accompaniment signals corresponding to a musical program, said method comprising the steps of:

(a) providing a recording medium which has an audio storage unit and a lyric storage unit separate from the audio storage unit, the audio storage unit and the lyric storage unit respectively having a plurality of audio music data and a plurality of lyric data corresponding to a plurality of the musical programs stored therein, the lyric data including encoded text data and timing information;

(b) retrieving the audio music data and the lyric data corresponding to a selected one of the musical programs from the recording medium;

(c) decoding the encoded text data and timing information retrieved from the recording medium to obtain decoded data;

(d) generating bitmap data from the decoded data;

(e) synchronizing the bitmap data with the audio music data retrieved from the recording medium in accordance with the timing information;

(f) providing the audio music data retrieved from the recording medium to an audio converter means to obtain an audio output; and (g) providing the bitmap data to a bitmap converting means to obtain a video signal.

2. The method of claim 1, wherein the audio music data stored in the audio storage unit are compressed data, the method further comprising, prior to step (e), the step of decoding the audio music data corresponding to the selected one of the musical programs.

3. The method of claim 2, wherein the audio music data stored in the audio storage unit are MPEG Layer 3 standard compressed data.

4. The method of claim 1, further comprising the steps of generating a highlighting command signal in accordance with the timing information, and providing the highlighting command signal to the bitmap converting means simultaneous with the bitmap data.

5. The method of claim 4, wherein:

the text data include program description information and verses of the corresponding one of the musical programs; and the timing information include: show time information for controlling when the bitmap data for the verses of the corresponding one of the musical programs are to be provided to the bitmap converting means in relation to supply of the audio music data of the corresponding one of the musical programs to the audio converter means; start time information for controlling start of generation of the highlighting command signal for the verses of the corresponding one of the musical programs after the bitmap data for the verses have been provided to the bitmap converting means; and ticks information for controlling frequency of generation of the highlighting command signal for words in the verses of the corresponding one of the musical programs after the bitmap data for the verses have been provided to the bitmap converting means.

6. The method of claim 1, wherein the recording medium further has a video storage unit separate from the audio storage unit and the lyric storage unit, the video storage unit having a plurality of video segments to be commonly shared by the plurality of the musical programs stored therein.

7. The method of claim 6, further comprising the steps of:

(h) retrieving at least a section of the video segments from the recording medium in an order; and (i) combining the video signal and the sections of the video segments retrieved from the recording medium to obtain a video output.

8. The method of claim 7, wherein the sections of the video segments are retrieved from the recording medium in a random order.

9. The method of claim 7, wherein the sections of the video segments are retrieved from the recording medium in a sequential order.

10. The method of claim 7, further comprising the steps of, prior to step (i), processing the section of a preceding one of the video segments retrieved from the recording medium to generate a fade-out effect at the end of the section of the preceding one of the video segments, and processing the section of a succeeding one of the video segments retrieved from the recording medium to generate a fade-in effect at the start of the section of the succeeding one of the video segments.

11. An apparatus for generating musical accompaniment signals corresponding to a musical program, said apparatus comprising:

a recording medium which has an audio storage unit and a lyric storage unit separate from the audio storage unit, the audio storage unit and the lyric storage unit respectively having a plurality of audio music data and a plurality of lyric data corresponding to a plurality of the musical programs stored therein, the lyric data including encoded text data and timing information;

processor means connected said recording medium and operable so as to retrieve the audio music data and the lyric data corresponding to a selected one of the musical programs from the recording medium, said processor means decoding the encoded text data and timing information retrieved from said recording medium to obtain decoded data, and generating bitmap data from the decoded data, said processor means further synchronizing the bitmap data with the audio music data retrieved from said recording medium in accordance with the timing information;

audio converter means connected to said processor means, said processor means providing the audio music data retrieved from said recording medium to said audio converter means so as to obtain an audio output; and bitmap converting means connected to said processor means, said processor means providing the bitmap data to said bitmap converting means so as to obtain a video signal.

12. The apparatus of claim 11, wherein the audio music data stored in said audio storage unit are compressed data, said processor means decoding the audio music data corresponding to the selected one of the musical programs prior to synchronizing the bitmap data with the audio music data.

13. The apparatus of claim 12, wherein the audio music data stored in said audio storage unit are MPEG Layer 3 standard compressed data.

14. The apparatus of claim 11, wherein said processor means generates a highlighting command signal in accordance with the timing information, and provides the highlighting command signal to said bitmap converting means simultaneous with the bitmap data.

15. The apparatus of claim 14, wherein:

the text data include program description information and verses of the corresponding one of the musical programs; and the timing information include: show time information for controlling when the bitmap data for the verses of the corresponding one of the musical programs are to be provided by said processor means to said bitmap converting means in relation to supply of the audio music data of the corresponding one of the musical programs by said processor means to said audio converter means; start time information for controlling start of generation of the highlighting command signal for the verses of the corresponding one of the musical programs after the bitmap data for the verses have been provided by said processor means to said bitmap converting means; and ticks information for controlling frequency of generation of the highlighting command signal for words in the verses of the corresponding one of the musical programs after the bitmap data for the verses have been provided by said processor means to said bitmap converting means.

16. The apparatus of claim 11, wherein said recording medium further has a video storage unit separate from said audio storage unit and said lyric storage unit, said video storage unit having a plurality of video segments to be commonly shared by the plurality of the musical programs stored therein.

17. The apparatus of claim 16, wherein said processor means further retrieves at least a section of the video segments from the recording medium in an order, said apparatus further comprising combining means connected to said processor means and said bitmap converting means for combining the video signal and the sections of the video segments retrieved from said recording medium to obtain a video output.

18. The apparatus of claim 17, wherein said processor means retrieves the sections of the video segments from said recording medium in a random order.

19. The apparatus of claim 17, wherein said processor means retrieves the sections of the video segments from said recording medium in a sequential order.

20. The apparatus of claim 17, wherein said processor means processes the section of a preceding one of the video segments retrieved from said recording medium to generate a fade-out effect at the end of the section of the preceding one of the video segments, and processes the section of a succeeding one of the video segments retrieved from said recording medium to generate a fade-in effect at the start of the section of the succeeding one of the video segments.

21. The apparatus of claim 17, wherein said bitmap converting means comprises a VGA card and said video signal is a VGA signal.

22. The apparatus of claim 21, wherein the video segments are MPEG standard encoded signals, said combining means comprising an MPEG card that overlays the VGA signal from said bitmap converting means onto the sections of the video segments retrieved from said recording medium.

* * * * *